Patented Aug. 20, 1940

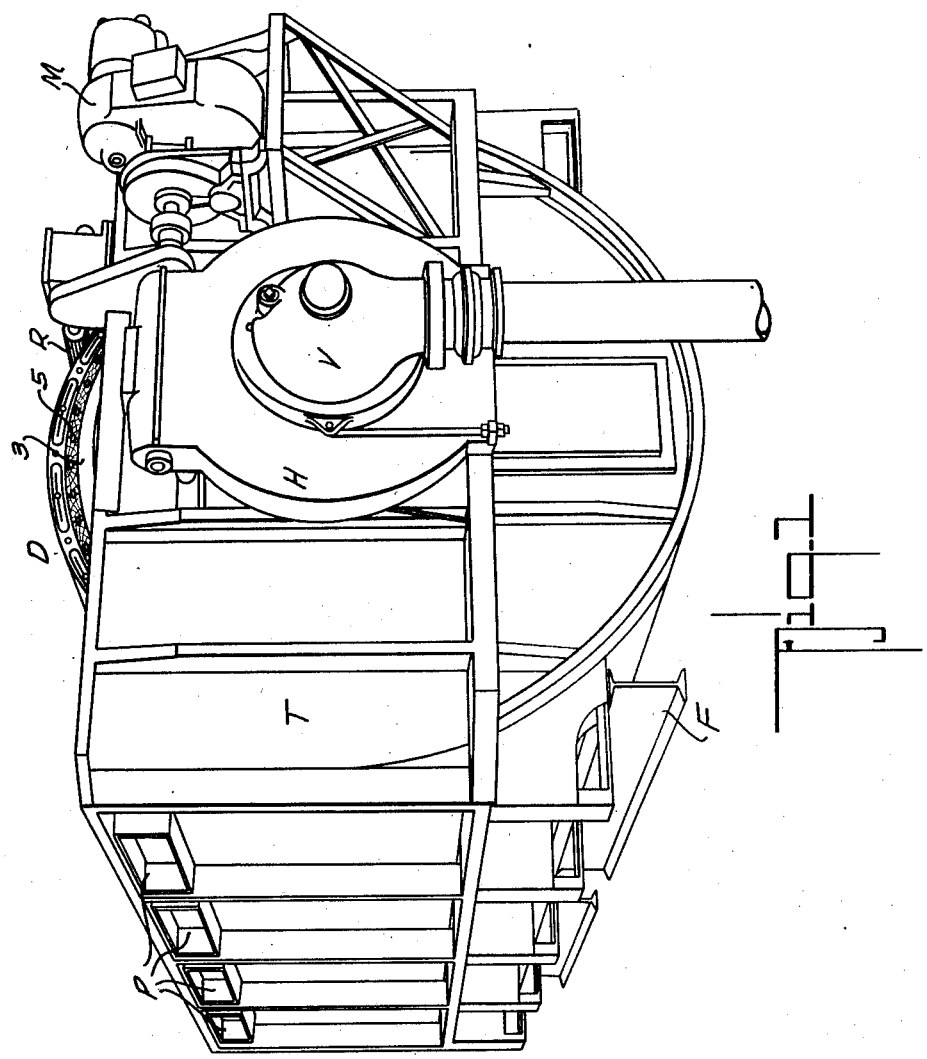

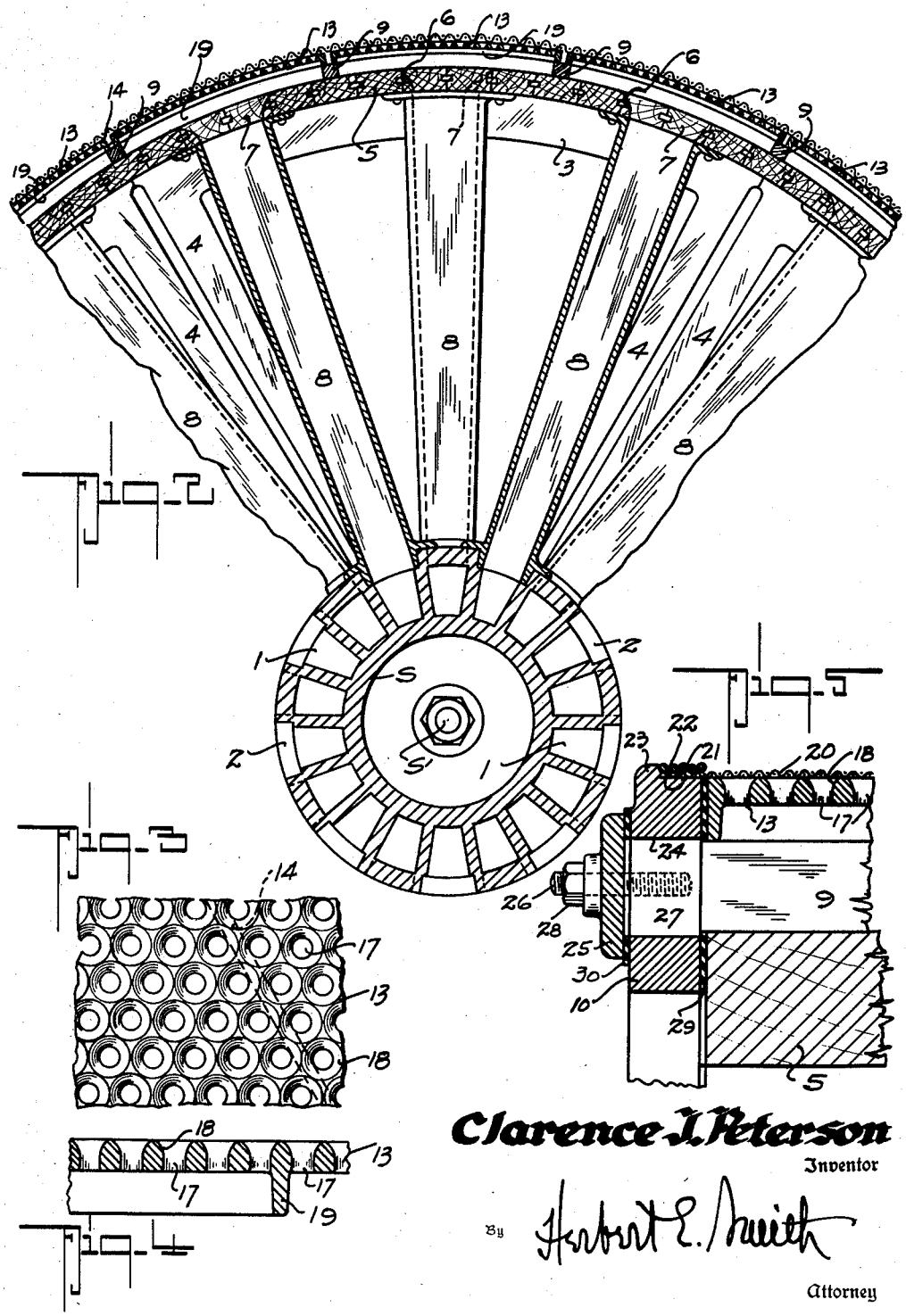

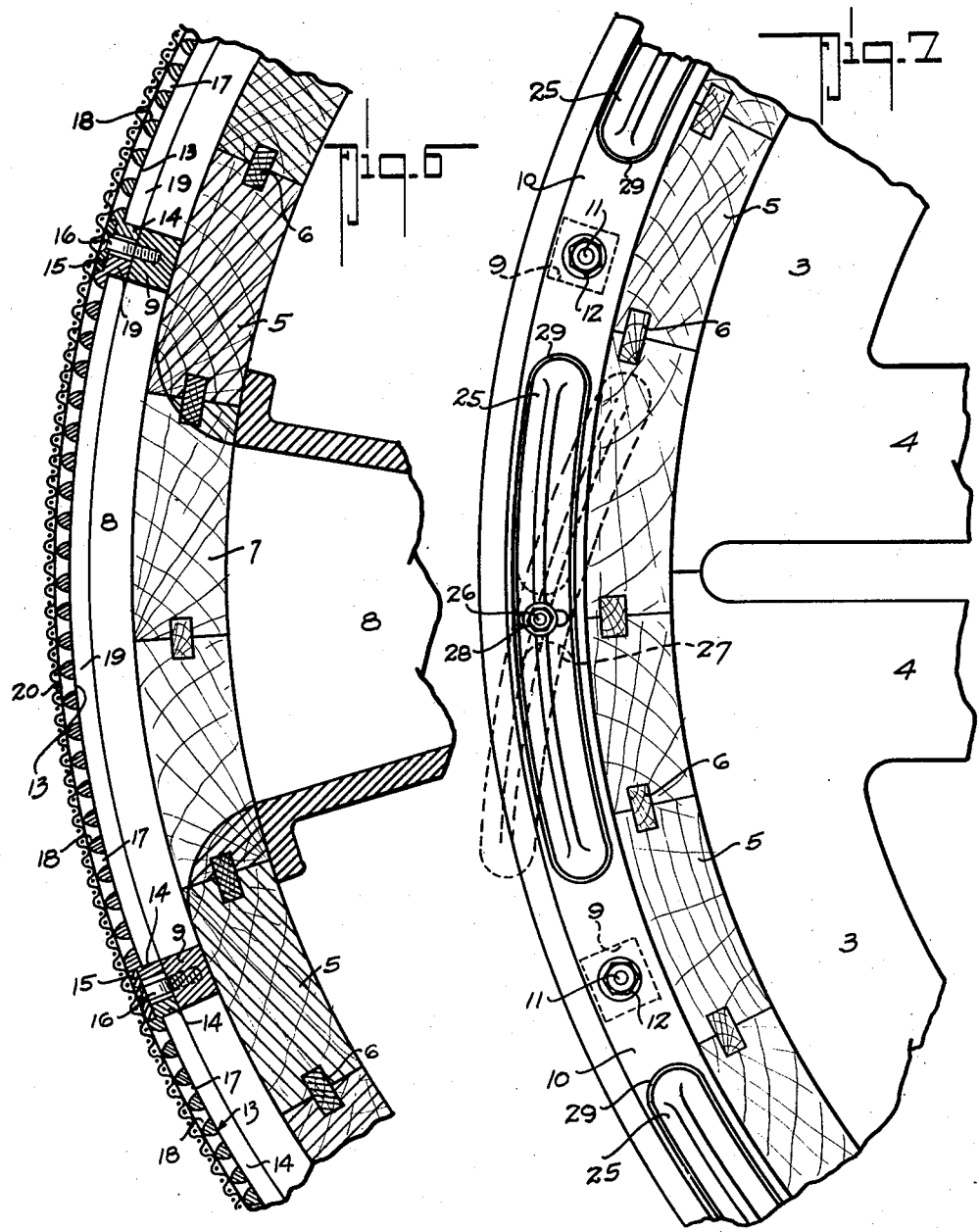

2,212,168

UNITED STATES PATENT OFFICE 2,212,168

ROTARY DRUM FILTER

Clarence J. Peterson, Salt Lake City, Utah, assignor to The Eimco Corporation, Salt Lake City, Utah Application October 20, 1937, Serial No. 170,015

1 Claim. (Cl. 210—202)

My present invention relates to improvements in rotary drum filters and particularly to the construction and operation of the rotary filtering drum, as used in paper pulp mills, and for other purposes, where the liquid is to be separated from the solid matter of the pulp, and the pulp is formed in a continuous sheet or cake and removed from the exterior periphery of the rotary filter drum by means of a discharger roll. As is well known to those familiar with the art, a substantial loss in paper pulp is sustained in the use of rotary drum filters due to the inefficient arrangement of the filtering faces of the rotary drum which do not thoroughly separate the wood fibers from the water. Another factor, which causes deterioration of the filtering drum, and inefficient operation of the filtering faces of the drum is the accumulation of "slime" or deposits of insoluble materials on portions of the filter walls. As at present used the filter drums are so constructed and their walls are so arranged as to make it very difficult to remove this accumulated slime, and considerable time is lost and labor involved in cleansing the filtering parts of this slime.

In carrying out my invention I so construct and arrange the filtering walls as to insure a maximum efficiency in the filtering process with thorough separation of water from the fiber, and likewise thorough separation of the fiber from the water; and means are provided whereby the filtering walls of the drum are readily accessible for cleansing so that the walls may be washed with flowing water at required intervals, to remove the accumulated slime, and maintain a maximum efficiency in the performance of the functions of the rotary drum.

The invention consists in certain novel combinations and in the filtering walls and the structure of the rotary filtering drum as will hereinafter be more fully set forth and claimed. In the accompanying drawings I have illustrated one complete example of the physical embodiment of my invention wherein the parts are combined and arranged according to one mode I have thus far devised for the practical application of the principles of my invention. It will be understood that changes and alterations may be made in the exemplifying drawings within the scope of my claim without departing from the principles of my invention.

Figure 1 is a perspective view of a rotary filter embodying my invention indicating the driving mechanism for the rotary drum and the driving mechanism for the discharger roller, together with the valved outlet for the filtered water.

Figure 2 is an enlarged, transverse sectional view through the tubular shaft of the drum and showing also a portion of the cylindrical drum, together with radial ducts between the filter faces and the central tubular shaft.

Figure 3 is a plan view, enlarged, of a portion of a filter-plate or section, upon which the filter cloth or screen is mounted; and Figure 4 is a sectional detail view at line 4—4 of Figure 3.

Figure 5 is an enlarged detail sectional view through one of the clean-out openings used at opposite ends or heads of the cylindrical drum, showing the closure-plate in section.

Figure 6 is an enlarged detail section, transversely of the drum, showing particularly the filter face of the drum, or a section thereof, and the ported intake end of one of the radial tubes which form ducts from the filter section to the central tubular drum-shaft.

Figure 7 is a fragmentary view at one end or head of the drum showing a clean-out plate closed in full lines, and opened in dotted lines to give access to the hose for washing the interior of the filtering face of the section.

In order that the general arrangement and utility of parts may readily be understood I have shown in Figure 1 a well known type of rotary drum filter including the tank T having a frame F and a semi-circular bottom, and provided with lateral inlet ports P near an upper edge of the tank wall, for the pulp.

The rotary drum, indicated as a whole by the letter D is journaled in suitable bearings in the end walls of the tank, and a motor M is employed to revolve the drum through transmission gears mounted in the housing H at the near end of the tank. This motor also supplies power for the discharger roller R, which takes the sheet, web, or cake from the filter drum, the transmission mechanism from the motor to the roller being enclosed in housings or boxes X and Y. The filtered water flows longitudinally through the drum-shaft, indicated as a whole by the letter S, and is disposed of through a valve-head within the valve casing V and the leg L, Figure 1, of an outlet pipe, both located exterior of and at one end of the tank T.

As best seen in Figure 2, the tubular shaft S which extends longitudinally through the drum D is provided with trunnions S' at its opposite ends, for the head structures of the drum and for the journal bearings of the rotary drum, and the shaft is fashioned with an annular series of passages 1 concentric with the axis of the shaft, and arranged longitudinally exterior of the central tubular portion of the shaft. The circumferential wall of the tubular shaft, which forms the exterior walls for the longitudinal passages, is provided at suitable intervals with ports 2, in Figure 2, opening into the interior of the passages through which ports the filter water passes to the passages, thence out through the valve head in the casing V of Figure 1, and then down through the leg L.

The opposite ends of the rotary drum are provided with spider frames or transverse heads made up of segments 3 that form annular supporting bands, with integral radial arms or spokes 4, and these spokes converge to form a hub that is suitably mounted on the shaft S so that the drum and shaft shall revolve together.

The deck 5 of the drum is fashioned of deckboards having lateral grooves, that are joined together by means of tongues 6 in usual manner, and this deck, or cylindrical wall of the drum is supported at its ends on the spider frames or heads of the drum, the parts being fastened together in appropriate manner.

The deck or cylindrical wall of the drum is provided with parallel rows of intake ports 7, the rows extending longitudinally of the drum, and these wall-ports 7 are arranged complementary to the shaft-ports 2, in order that the ports may be connected by means of radial tubes 8, which are fashioned with flanged ends. The inner ends of these tubes are seated in the ports 2 and the outer ends of the tubes are fastened at the inside of the drum-wall, about the ports 7. These tubes, which form radial ducts between the filter face and the conveyer passages 1 of the shaft, preferably are larger in diameter at their outer ends than at their inner ends, to adapt them to the inlet ports 7 of the drum, which as noted are larger than the shaft ports 2, to afford an enlarged intake area for water in the filter wall.

These rows of intake ports 7 in the cylindrical wall or deck of the drum open into separate, spaced, longitudinally extending chambers at the exterior periphery of the deck, and these chambers are formed by means of parallel ribs or strips 9, located between rows of ports and fastened in suitable manner to the exterior face of the drum. The water, passing through the filtering screen or cloth of the drum, enters these chambers, and thence passes through the radial ducts to the tubular shaft.

At the opposite ends of the drum, exterior of the spider heads or frames, are provided retaining rings 10, arranged at the outer periphery of the drum, and these rings provide the end-closures for the water chambers or filter sections between adjoining longitudinal ribs 9. The rings are fastened at the ends of the ribs by means of bolts 11 and nuts 12, and they not only provide the end-closures for the longitudinally extending water chambers, but they provide the deckle edges for the sheet, cake, or continuous web that is formed on the drum and taken therefrom on discharger roller R in Figure 1.

Between these retaining rings the filtering mediums or elements are held, including the longitudinally extending filter plates 13 that are arcuate in cross section and provided with inner, lateral supporting flanges 14. These plates span the space between adjoining ribs or strips 9 and they form the outer perforated walls of the water filtering sections or chambers. The supporting flanges 14 rest on the longitudinal ribs, and in Figure 6 particularly, it will be seen that the outer faces of the plates, at their lateral edges, are notched or countersunk to receive retaining washers 15 through which the fastening screws 16 pass, and these screws, located between edges of adjoining plates, are threaded or spotted into the strips 9 to firmly hold the sectional filter plates on the strips at the periphery of the drum.

As best seen in Figures 3 and 4 the filter plates are fashioned with a multiplicity of transverse ports 17 which flare outwardly, as at 18, and these perforations, with their flared outer openings provide an intake area for water that covers substantially the entire outer surface of the several filter plates. As best seen in Figure 4 the inner sides of these filter plates that form the outer walls of the filter sections at the exterior of the drum-deck are fashioned with reinforcing flanges 19 as braces for the arched plates.

The filter cloth or filter screen 20 as a reticulated, cylindrical filter element, is mounted directly on the outer surface of the perforated cylindrical plate-wall, and it will be understood of course because of the slight but positive separation of chambers or sections by the combination of supporting flanges 14 and strips 3 that this reticulated filtering element or filter cloth passes through the pulp in the lower semi-cylindrical bottom of the tank, as the rotary drum is revolved, picking up a continuous sheet or web or cake, from which the water is filtered and disposed of as described.

The reticulated screen, or filter cloth, at its edges 21 in Figure 5, is folded to form an annular attaching edge that is secured in suitable manner against the grooved annular surface 22 of the two rings 10, and at the outer edge of each ring 10 a deckle edge 23 is provided for retaining the edges of the continuous sheet or web or cake of pulp formed on the filtering wall of the drum.

This annular grid, which is of comparatively heavy construction and is formed of the arcuate sections of filter plates that form the backing for the reticulated filter cloth or cylindrical screen, and as best seen in Figure 6, offers a minimum area of contact between the wire mesh 20 and the cylindrical supporting grid 13. The minimum area of contact between the grid and the wire mesh provides for a minimum obstruction to the passage of water from the exterior to the interior of the filtering wall of the drum, i. e. from the cake or sheet to the sectional water spaces or chambers. With this minimum of resistance, the continuous shower or rain of water through the filtering wall into the water chambers, as the water is separated from the cake on the filter tends to prevent to a great extent the formation of slime on the filtering elements.

However, I provide means for cleaning out or washing the faces of the filtering parts to remove slime at required intervals and this may be done by the use of a hose and nozzle that injects water or cleansing liquid into the water chambers for carrying off the slime through the radial ducts 8. For this purpose the retaining ring 10 at each end of the drum, or at one end of the drum as shown is provided with circumferentially extending or arcuate ports 24 in the nature of slots through the ring, and these ports normally are closed by complementary arcuate shaped closure plates, mounted on the exterior face of the ring. These plates are clamped against the ported or slotted ring by means of bolts, as best seen in Figure 5, where the plate 25 is fashioned with a central bolt hole, and the bolt 26, which has one end threaded in a cross web 27 projects through this hole to receive a clamp nut 28. The bolt is threaded only at its ends, leaving a smooth portion to be used as a journal on which the closure plate may be turned, as indicated by dotted lines in Figure 7. By loosening the nut 28, the closure plate may be turned as indicated by the dotted lines to give access to the nose nozzle for injecting the cleansing liquid into the interior of the water chambers of the filtering wall.

To afford airtight joints at the ends of the water chambers, an annular gasket or packing ring 29 is used between the inner face of the retaining ring, the deck 5 and the filter plates 13, and the packing gaskets 30 are also used between the closure plates and the retaining ring.

Having thus fully described my invention, what I claim as new and desire to secure by Letters Patent is:

In a cylindrical filter drum having a ported deck and a circumferentially spaced series of longitudinally extending ribs forming spaced water-inlet chambers, of an annular series of longitudinally extending ported filter plates arcuate in cross section, supporting flanges on the adjoining edges of said plates, said flanges having opposed notched edges to receive washers flush with the ported deck, bolts for fastening said washers and plates to the ribs, and a cylindrical reticulated filter screen mounted on said series of plates.

CLARENCE J. PETERSON.